Nov. 28, 1944.  D. A. W. ROBERTS  2,363,805

APPARATUS FOR PREPARING SURGICAL PLASTER BANDAGES

Filed Oct. 13, 1941

INVENTOR

DONALD ARTHUR WILLIAM ROBERTS

BY

Young, Emery + Thompson

ATTYS.

Patented Nov. 28, 1944

2,363,805

UNITED STATES PATENT OFFICE 2,363,805

APPARATUS FOR PREPARING SURGICAL PLASTER BANDAGES

Donald Arthur William Roberts, New Plymouth, New Zealand, assignor of thrity-two and one-half per cent to Ronald Winthrop and twenty-five per cent to Gordon Francis Rich, both of New Plymouth, New Zealand Application October 13, 1941, Serial No. 414,902

3 Claims. (Cl. 91—30)

This invention has been devised with the object of providing for the preparation of surgical plaster bandages of the nature in which the fabric material of which they are generally formed, is impregnated with dry plaster of paris powder and thereby made ready for use.

The invention employs the known method consisting in feeding the bandage material lengthwise and in a flat condition along beneath the downwardly opening mouth of a hopper containing a supply of the said powder so that as the bandage passes beneath such mouth the powder will be spread over its surface in the required manner.

The invention comprises a construction of machine that has been designed for use in carrying out this method of preparing the bandages and the nature of which machine will allow for bandages of various widths being treated and also for a plural number of bandages being prepared simultaneously. A feature of the machine's construction provides for the bandages being fed from the original roll through the machine, and rolled again after being treated with the powder. In the machine's construction also, provision is made for the amount of powder, or extent of impregnation of the bandage material with the power, being regulated and varied.

In fully describing the invention reference will be made to the accompanying sheet of drawings, in which.

Figure 1:
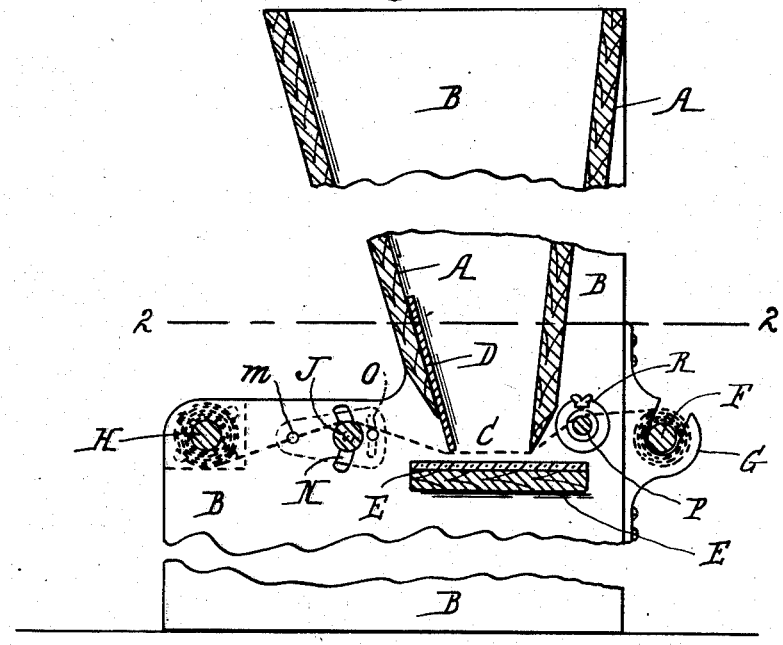
Figure 1 is a vertical sectional view of the said machine.
Figure 2:
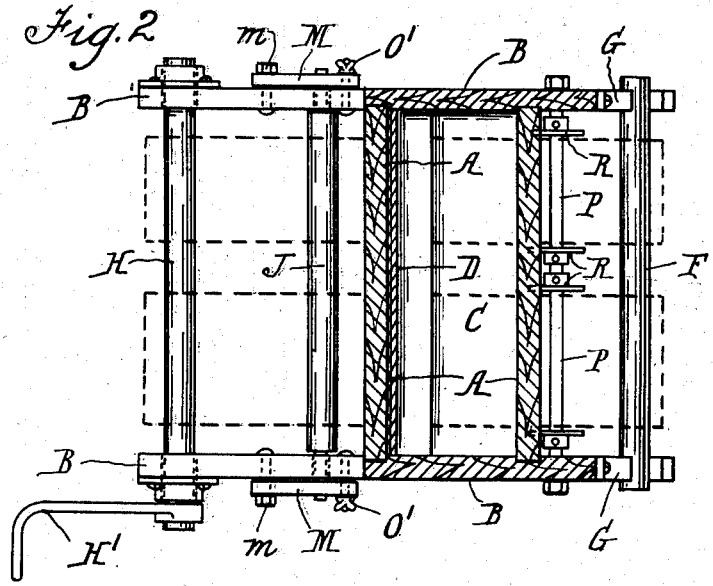
Figure 2 is a horizontal sectional view thereof taken on the line 2—2 of Figure 1.

The machine designed, which is made of any suitable material, comprises a hopper A of approved capacity adapted to contain a supply of the plaster powder. This hopper is held between side frame members B which may be continued downward to form supports upon which the machine may stand. The hopper narrows down in its depth from front to rear to a slot opening C at the bottom, which slot extends across the full transverse width of the hopper. The edges of the slot are bevelled as shown and the rear edge may be formed by a metal plate D secured upon the inside of the hopper back to project downward below the edge of such back.

A flat plate E is fixed to extend horizontally across between the side members B below the hopper opening C and the width of this plate is such as to extend across the width of the opening. The surface of the plate is smoothed in any approved manner as by being formed of glass. The plate is so arranged that a narrow space is left between it and the bottom edges of the hopper sufficient for a bandage to be passed between in the manner hereinafter described.

Across the front of the hopper a spindle F is disposed horizontally, such spindle being loosely carried at its ends in slot bearings G affixed to the respective side edges of the hopper. The spindle may be lifted from such bearings or replaced therein at will, and is designed to have the bandage rolls which are to be treated by the machine arranged thereon by being slipped over the spindle ends.

A second spindle H is provided and this is disposed across the rear of the hopper and carried in bearings formed in rearward extensions of the said side members B. This spindle is provided with a crank handle H' at one of its ends for use in rotating the spindle.

The bandage rolls placed on the front spindle F are designed to have their free ends passed beneath the hopper and across the plate surface E and then attached to the rear spindle H and thus by the rotation of this spindle to be rolled thereon while unrolling from the other spindle and passing in a taut spread out condition across the open mouth C of the hopper bottom. If therefore the hopper contains a supply of the plaster powder the powder will rest on the bandage surface so that by the rubbing contact of the bandage therewith, the bandage will be coated with the powder to the necessary extent to impregnate the mesh of the bandage fabric. The plate D will act as a scraper to engage the bandage surface and thereby prevent an excess of powder passing away with the bandage.

To provide for the amount of powder thus spread into the bandage being regulated, provision is made for the bandage being tensioned upwardly upon this scraping plate edge in different degrees of tension. For this purpose a roller J is provided to extend across between the hopper side members B to the rear of the hopper and between it and the spindle H, and such roller is disposed above the level of the said scraping edge and the bandage is carried up over it before passing to the spindle H. It is thereby drawn up against such edge. The upward tension is regulatable by mounting the roller in means whereby its level may be varied. This is effected in the construction shown by carrying each end of the roller in the outer end of a quadrant plate M pivoted at $m$ on the outside of the member B the roller end passing out through a slot N formed in the said member and curving concentrically with the pivot m. The plate is slotted as at O to receive a set screw O' passing through the member, so that the plate may be turned on its pivot to raise or lower the roller J and then be fastened at any level desired within the range thus provided for. This variation in tension on the bandage as it passes across the scraper plate D will thus cause more or less of the powder caught up by the bandage being left therein. Any special degree of powder impregnation may thus be provided for. Other ways of adjusting the level of this tension roller may be employed.

A guide rod P may be arranged across the front of the hopper, between spindle F and the hopper, so that the bandages may pass over it as they are fed into the space beneath the hopper. This rod is provided with guide discs R fitted to slide thereon and capable of being fixed at any points along the rod length to serve to keep the bandages straight as they are drawn through the machine.

The bandage rolls collecting upon the rear spindle H will, when finished, be removed from such spindle, by sliding the spindle lengthwise from within them. To facilitate their freedom from the spindle, ferrules may be provided to fit upon the spindle and to receive the bandages, or the spindle may be made to expand and contract by any approved and known method so that it is expanded to receive the rolls and contracted to free itself from them.

Any number of bandages may be arranged side by side within the limits of the width of the machine, for passing through the machine simultaneously. The movement of the bandages across beneath the hopper mouth will serve to keep the powder in the hopper in a free running condition. If desired however, the hopper may be furnished with agitators for this purpose.

The machine may have a collecting bin provided therein and placed beneath the plate E to catch and collect any excess of powder that may fall from the hopper during the drawing of the bandages through the machine and which will fall over the edge of the plate E.

The operation of feeding each bandage roll end into the machine may suitably be carried out by pushing it through beneath the hopper mouth by any suitable tool such as a flat blade across the front of which the bandage end is doubled.

I claim:

1. Apparatus for the preparation of surgical bandages by impregnation with powdered material comprising, in combination, a hopper having rear and front walls terminating in a transverse slot opening at the bottom, a scraper at the bottom of said rear wall, a plate disposed horizontally beneath the said slot opening at a short distance away therefrom, a spindle adapted to carry a roll of bandage material mounted to extend across the front of the hopper, a similar spindle mounted to extend across the rear of the hopper, which spindles have their axes parallel to each other and horizontal at about the level of the bottom of said hopper whereby a roll of said material placed on the front spindle may be passed therefrom across the aforesaid plate and beneath the hopper slot opening and wound upon the spindle at the rear, tensioning means between said scraper and the said rear spindle and positioned above the level of the working edge of said scraper and parallel to said edge, and means for adjustment of said means in its level in relation to such scraping edge.

2. Apparatus in accordance with claim 1, in which the said tensioning roller is carried at its respective ends by being journalled in quadrants pivoted to the apparatus and having means associated therewith whereby the quadrants may be turned on their pivots and may be locked from movement.

3. Apparatus in accordance with claim 1, in which a guide bar is arranged between the said hopper and the front spindle and a number of discs are slidably mounted on such bar and have means for locking them from movement.

DONALD ARTHUR WILLIAM ROBERTS.